W. KING.
Improvement in Harvester-Rakes.

No. 129,035. Patented July 16, 1872.

Witnesses:
A. Bennerendorf
W. A. Graham

Inventor:
Walter King
PER Munn & Co
Attorneys.

UNITED STATES PATENT OFFICE.

WALTER KING, OF RICHMOND, ASSIGNOR TO THE MULTIPLIER AGRICULTURAL MACHINE COMPANY, OF KANSAS CITY, MISSOURI.

IMPROVEMENT IN HARVESTER-RAKES.

Specification forming part of Letters Patent No. 129,035, dated July 16, 1872.

Specification describing a new and useful Improvement in Automatic Harvester-Rake, invented by WALTER KING, of Richmond, in the county of Ray and State of Missouri.

Figure 1:
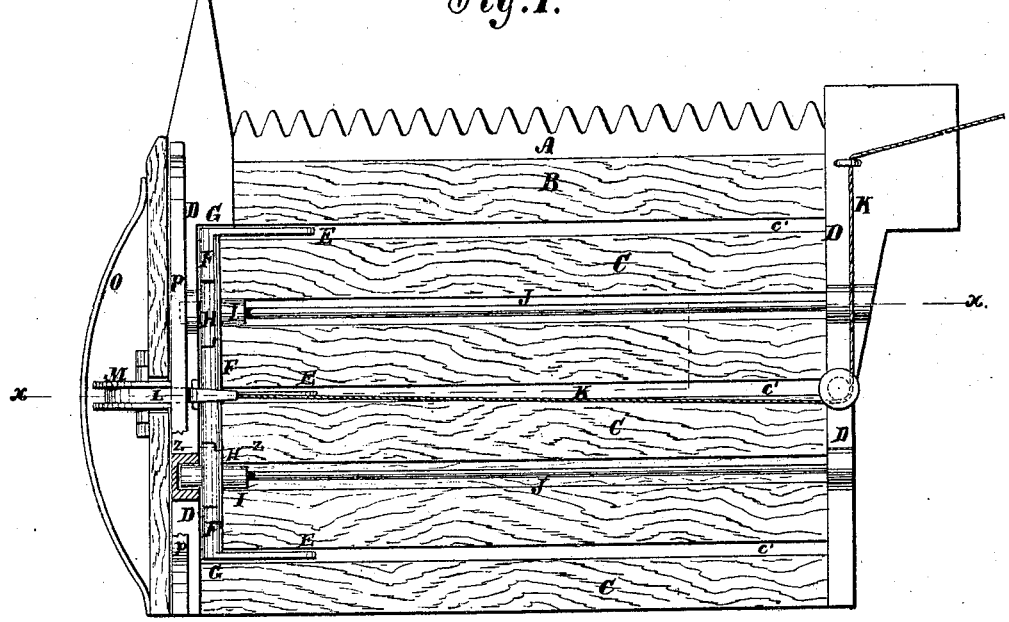
Figure 4:
Figure 2:
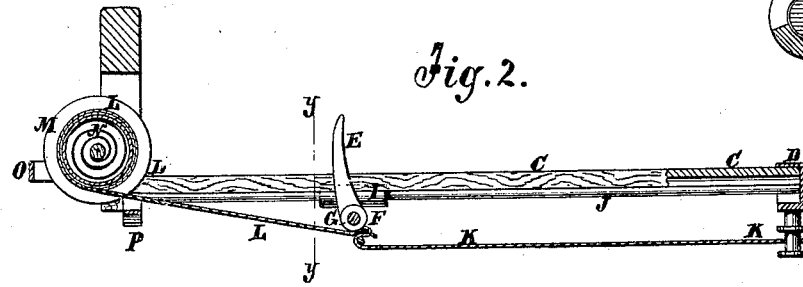
Figure 3:
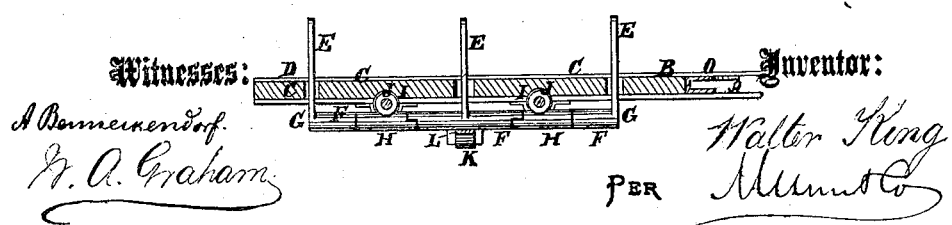

Figure 1 is an under-side view of the platform of a harvester to which my improved rake has been applied. Fig. 2 is a detail sectional view of the same taken through the line $x\ x$, Fig. 1. Fig. 3 is a detail sectional view of the same taken through the line $y\ y$, Fig. 2. Fig. 4 is a detail cross-section of the rake-shaft taken through the line $z\ z$, Fig. 1.

Similar letters of reference indicate corresponding parts.

My invention has for its object to furnish an improved automatic harvester-rake, simple in construction and effective and reliable in use; and it consists in the construction and combination of certain parts of the rake and platform, as hereinafter more fully described.

A represents the cutter-bar, and B the finger-bar, of the harvester, about the construction of which parts there is nothing new. The platform is formed of three boards, C, placed side by side, and at such a distance apart as to form spaces or slots $c'$ for the passage of the rake-fingers. The ends of the boards C are secured and held in position by metallic plates D. E are the rake-teeth or fingers which are made slightly curved, and which are attached to or formed upon sleeves F, which are rigidly attached to a shaft, G. Upon the shaft G, between each two sleeves F, are placed sleeves H, which serve as bearings for the said shaft G. The adjacent ends of the sleeves F H are shouldered or notched, as shown in Figs. 1, 3, and 4, so that the said shoulders may act as stops to support the rake-fingers E in an upright position when sweeping the grain from the platform, and to hold them in a horizontal position when moving back. With the sleeves H are rigidly connected the sleeves I, which are placed at right angles with the sleeves H, and which are designed to receive and slide upon the rods J stretched beneath the platform, and the ends of which are connected with the end parts of the said platform. K is the rope or chain by which the rake is drawn forward to sweep the gavel from the platform, and which is operated from the driving mechanism of the harvester by any of the well-known means for making such connections. The inner end of the rope K is connected with the lower side of the sleeve F of the central finger E by a short arm or bracket, as shown in Figs. 1, 2, and 3. L is the strap by which the rake is drawn back after discharging a gavel, the inner end of which is attached to the lower side of the sleeve F of the central finger E, and is thus nearer the axis of the rake-shaft than is the point of attachment of the rope K, so that, when the said rope K is drawn upon, the first effect may be to turn the sleeve F against the strain upon the strap L, and thus elevate the fingers E into a vertical position and hold them raised so long as the strain is upon the said rope K. When the rope K is slackened the strain upon the strap L first revolves the rake-shaft to bring the rake-fingers E into a horizontal position beneath the upper surface of the platform, so that they may pass back freely beneath the grain lying upon said platform. The outer end of the strap L is attached to the drum M, pivoted to a shaft attached to supports at the outer end of the platform, and within which is placed a coiled spring, N, one end of which is attached to the drum M and its other end to the shaft of said drum.

By this construction, as the rake is drawn forward to sweep the gavel from the platform the spring N is coiled up, and by its tension draws the rake back as soon as the rope K is slackened. The drum M and strap L, at the outer end of the platform, are protected by guards O P, as shown in Figs. 1 and 2.

Having thus described my invention, I claim as new and desire to secure by Letters Patent—

The rake-teeth E, sleeves F and H formed with notched ends and interlocking as specified, and the sleeves I connected with the sleeves H and sliding on the rods J beneath the platform C, all arranged as shown and described, and operated by the cords K L and spring N, as set forth.

WALTER KING.

Witnesses:
JOHN R. BALIS,
T. B. ELDRIDGE.